June 13, 1967  M. W. GIESKIENG  3,325,640
DRAGGING EQUIPMENT AND SLIDING WHEEL DETECTOR FOR RAILWAYS
Filed Oct. 26, 1964  3 Sheets-Sheet 1
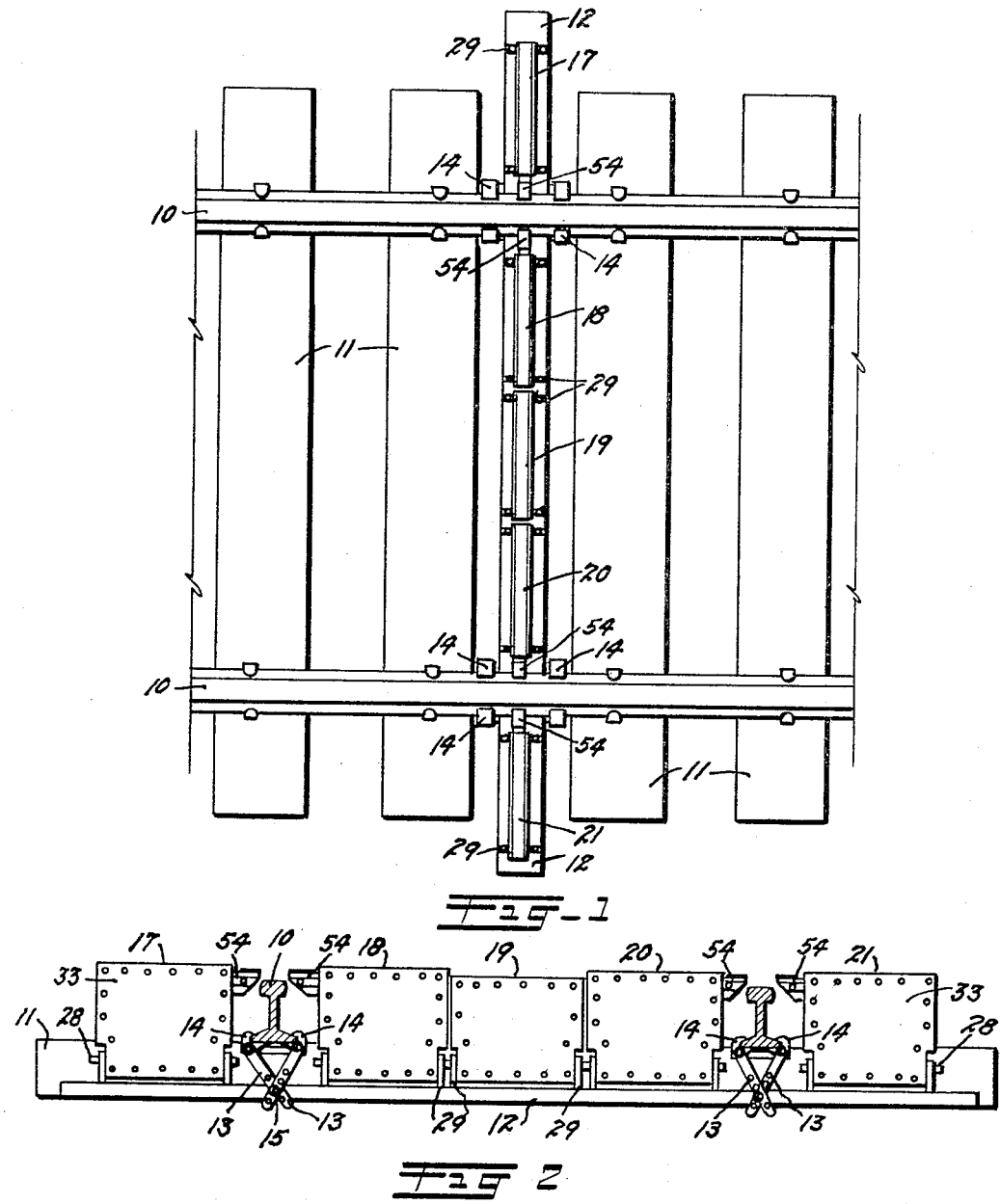
INVENTOR.
MARION W. GIESKIENG
BY
ATTORNEY

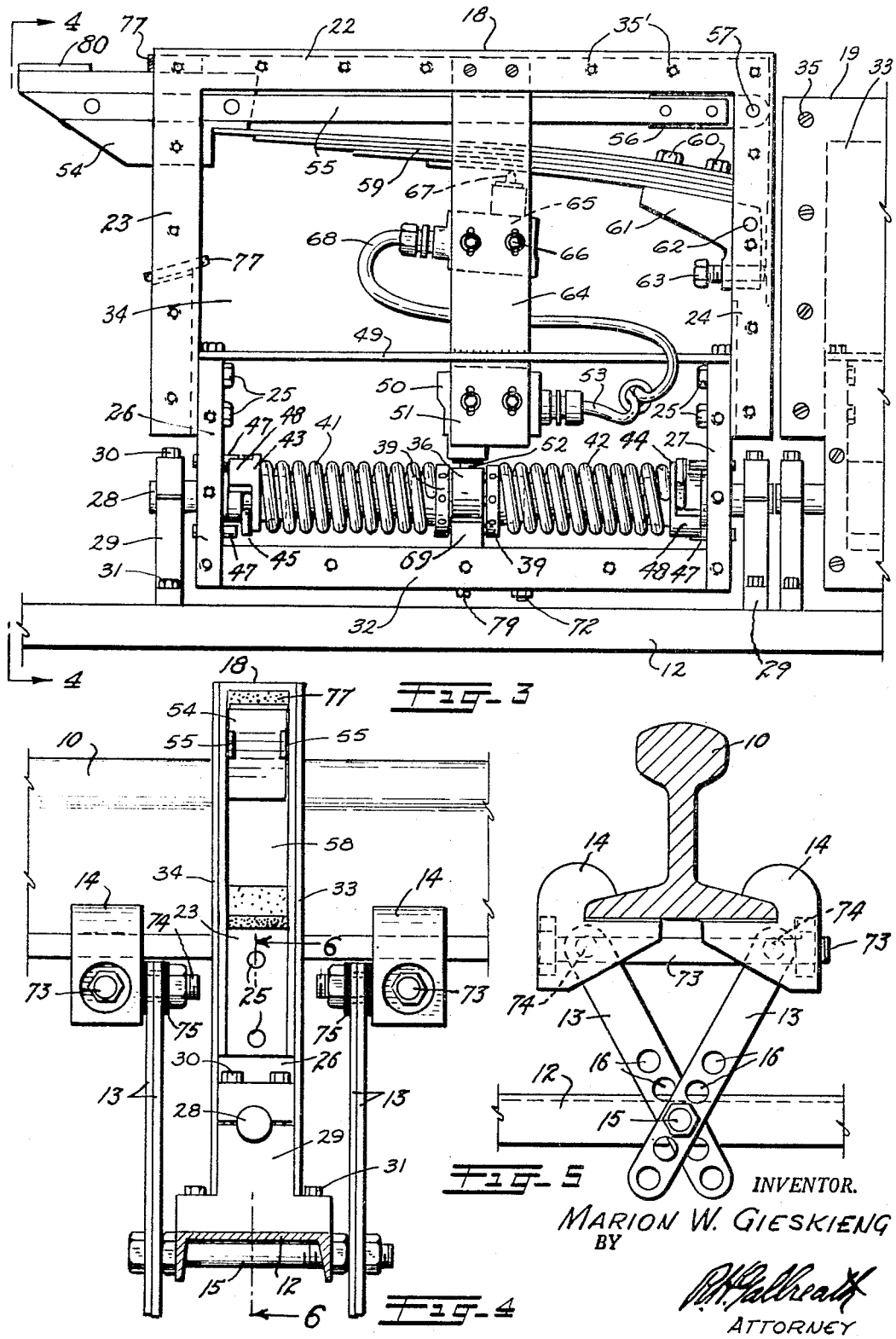

June 13, 1967  M. W. GIESKIENG  3,325,640
DRAGGING EQUIPMENT AND SLIDING WHEEL DETECTOR FOR RAILWAYS
Filed Oct. 26, 1964  3 Sheets-Sheet 3
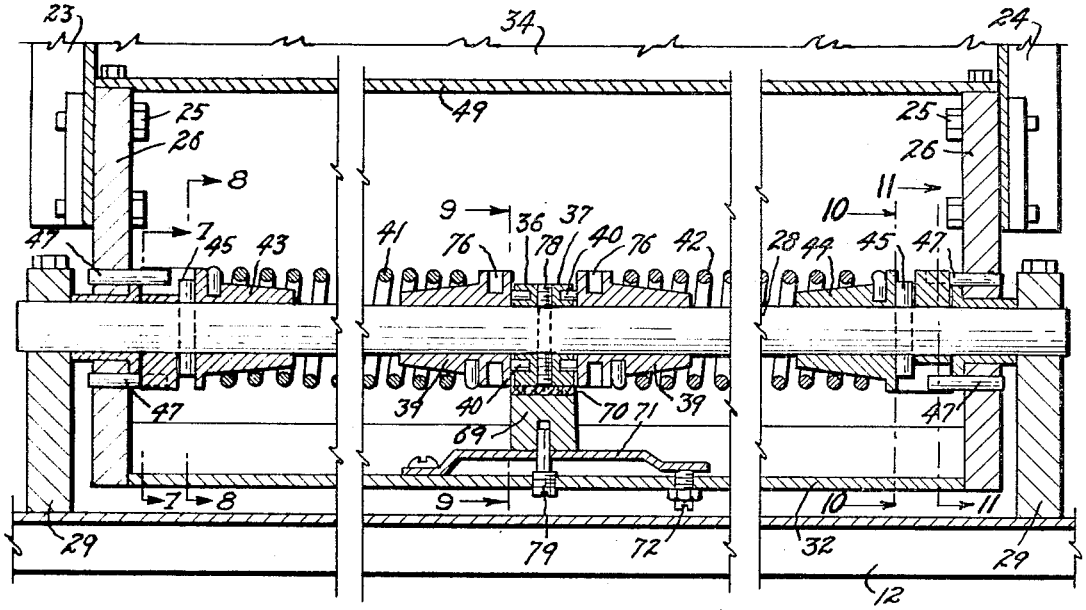
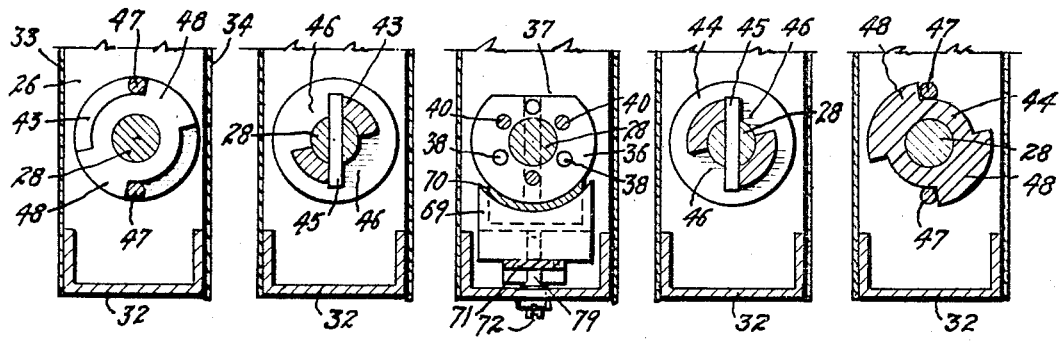
INVENTOR.
MARION W. GIESKIENG
BY
ATTORNEY United States Patent Office 3,325,640
Patented June 13, 1967

3,325,640
DRAGGING EQUIPMENT AND SLIDING WHEEL
DETECTOR FOR RAILWAYS
Marion W. Gieskieng, 1333 S. Franklin St.,
Denver, Colo. 80210
Filed Oct. 26, 1964, Ser. No. 406,363
8 Claims. (Cl. 246—246)

This invention relates to a detecting device for automatically detecting dragging equipment, such as defective brake beams and shoes, broken and bent safety bars, loose motor covers and other hazardous conditions on the cars of passing railways trains.

The principal object of the invention is to provide a rugged, highly efficient and positively acting, detecting device which can be readily installed in a selected railway track without change in the track, and without interference with the normal uses of the track or its related signal equipment, and which will act to operate an electrical signal circuit should equipment on any car or cars of a train passing in either direction, be depending or dragging below an allowable limit.

Another object of the invention is to combine a wheel counting device with the detecting device so that a record graph may be made of a passing train upon which the particular car or cars having dragging equipment or the like will be graphically indicated to facilitate a quick identification of the defective car or cars.

The most hazardous situations arise from dragging equipment in close proximity to the rails of the track which may be caught in frogs, switch points, crossings, etc., and drop upon the rails with possible resultant damage to the train and track equipment. A further object of this invention is to provide a detector which will locate defective car eequipment on both sides of, and closely adjacent to both sides of each rail as well as over the entire width of the track so as to reduce the possibility of non-detection at any point.

Other objects and advantages reside in the detail construction of the invention, which is designed for simplicity, economy, and efficiency. These will become more apparent from the following description.

In the following detailed description of the invention, reference is made to the accompanying drawing which forms a part hereof. Like numerals refer to like parts in all views of the drawing and throughout the description.

In the drawing:

FIG. 1 is a top plan view of a section of conventional railway track showing the detecting device of this invention in place thereon;

FIG. 2 is a lateral, cross-section of the track taken looking toward the detecting device of FIG. 1;

FIG. 3 is an enlarged fragmentary, elevational view of a portion of the detecting device wherein one element of the device is illustrated with its front cover plate removed to show the interior construction thereof;

FIG. 4 is a similarly enlarged, vertical, cross-section, taken on the line 4—4, FIG. 3, showing an end elevational view of a tilting element as employed in the detecting device;

FIG. 5 is a fragmentary, detail, cross-section through a rail illustrating the means for supporting the detector from the rail;

FIG. 6 is a still further enlarged, fragmentary section, taken on the line 6—6, FIG. 4, through the lower portion of a tilting element; and FIGS. 7, 8, 9, 10 and 11 are fragmentary cross-sectional views taken, looking toward the right, on the lines 7—7, 8—8, 9—9, 10—10 and 11—11, respectively, in FIG. 6.

In the drawing, the rails and ties of a conventional railway track are indicated at 10 and 11, respectively.

The improved detecting device is mounted on an elongated base channel 12 suspended below and transversely of the rails 10 upon four pairs of hangers 13. The hangers are secured to and extend downwardly, in crossed relation from studs 74 which project from rail clamps 14 clamped to the lower flanges of the rails by means of a clamp screw 73 so that the entire detection mechanism is suspended from, and moves with, all movements of the rails to maintain a uniform relation therewith. The hangers 13 are electrically insulated from the studs 74 and from the rail clamps 14 by suitable insulating spools 75 so as to prevent short-circuiting the two rails. The hangers are attached to the base channel upon suitable attachment bolts 15 and are provided with a plurality of spaced bolt holes 16 which may be selectively positioned on the bolts 15 to set the detector at a desired elevation.

The detecting device preferably employs five tilting elements designated in their respective entireties, from left to right in FIG. 2, by the numerals 17, 18, 19, 20 and 21. The tilting elements are tiltably mounted in longitudinal alignment along the top of the base channel. The elements 17, 18, 20 and 21 are similar in construction and a description of the construction of the element 18, as shown in FIGS. 3 and 4, will apply to all four of these elements.

The latter four elements comprise a top horizontal channel frame member 22 supported by two side channel frame members 23 and 24. The lower extremities of the two side channel frame members 23 and 24 are bolted, by means of suitable bolts 25, to the upper extremities of two tilting arms 26 and 27. The lower extremities of the two tilting arms 26 and 27 are welded to the extremities of a bottom channel frame member 32 having its channel side facing upwardly. The top and bottom channel frame members 22 and 32, the two side channel frame members 23 and 24 and the two tilting arms 26 and 27 preferably have a width of 2" and form an open rectangular frame the two sides of which are covered by two cover plates 33 and 34 secured in place by suitable attachment screws 35 which enter tapped holes 35' in the frame. In FIG. 3, the front cover plate 33 on the tilting element 18 has been removed to expose the following interior construction.

The tilting arms 26 and 27 are rotatably mounted upon, and adjacent to the extremities of, a stationary pivot shaft 28. The pivot shaft 28 is clamped at its extremities, against rotation, in shaft-clamping brackets 29, by means of suitable clamp screws 30, and the brackets 29 are mounted on the base channel 12 by suitable attachment screws 31.

A cam block 36 is fixedly mounted on the stationary pivot shaft 28 at the mid-point of the latter by means of a set screw 78. The top of the cam block 36 is formed with a flat side 37. The remainder of the block is concentrically circular. The two sides of the stationary cam block 36 are each provided with an annular series of key holes 38 and an inner spring-locking-bushing 39 is rotatably mounted on the shaft 28 at each side of the cam block. The bushings 39 are provided with projecting key pins 40 which engage in the key holes 38 to lock the bushings stationary at any desired relative position on the cam block 36.

Helical-torsion springs 41 and 42 are locked, in any suitable manner, at their inner extremities to each of the bushings 39 and extend oppositely outwardly therefrom about the pivot shaft 28. The outer extremity of the left spring 41 is locked to a left spring-winding bushing 43 and the outer extremity of the right spring 42 is locked to a similar, but oppositely-facing, right spring-winding bushing 44. The spring-winding bushings 43 and 44 are rotatably mounted on the pivot shaft 28, and the springs are stressed, so that, when looking toward the right, the left spring-winding bushing 43 will be urged in a counter-clockwise direction, as shown in FIG. 7 and the right spring winding bushing 44 will be urged in an opposite or clockwise direction as shown in FIG. 11. The degree of rotation of each spring-winding bushing is limited (to approximately 90°) by a stop pin 45 which extends through and projects from the shaft 28 into circumferentially elongated pin slots 46 in the bushings. The pin slots 46 in the left bushing 43 extends in a counter-clockwise direction from the stop pin 45, see FIG. 8, and the slots 46 in the right bushing 44 extend in clockwise direction from the stop pin 45, see FIG. 10. Thus, rotation of the left bushing 43 in a counter-clockwise direction is prevented but a substantially 90° clockwise rotation will be allowed and clockwise rotation of the right bushing 44 is prevented but a substantially 90° counter-clockwise rotation thereof will be allowed.

Rotation is imparted to the spring-winding bushings 43 and 44 by means of crank pins 47 mounted in and projecting inwardly from each of the tilting arms 26 and 27 above and below the shaft 28 so as to engage oppositely positioned lobes 48 formed on, and extending radially from, each of the spring-winding bushings 43 and 44. The crank pins 47 in the left tilting arm 26 are positioned, relative to the lobes 48 of the left spring-winding bushing 43, so that they may be freely rotated counter-clockwise away from the lobes and when moved clockwise they will contact the lobes to tighten the torsional tension in the left spring 41, as shown in FIG. 7. The pins 47 in the right tilting arm 27 are oppositely positioned relative to the lobes 48 of the right spring-winding bushing so that they may be freely rotated clockwise and when rotated counter-clockwise, they will contact the lobes of the right spring-winding bushing to tighten the torsional tension in the right spring 42, as shown in FIG. 11.

The result is, the tilting elements are resiliently maintained in a vertical position until one or more of the elements are contacted by dragging equipment on a train. When such a contact is made, the element being contacted will swing in the direction of train movement to actuate a signal contact as hereinafter described. Note that only the element contacted by the dragging equipment will be moved and only one of the springs 41 or 42 in that element will be torsionally actuated.

The torsional resistance of the individual springs can be adjusted as desired by moving the inner spring-locking bushing 39 of that spring away from the cam block so as to withdraw the key pins 40 from the block. The bushings 39 can then be rotated to tighten or loosen the spring torsion and the key pins reinserted in the block to lock the spring at the adjusted torsion. The bushings 39 are preferably provided with spanner wrench openings 76 to facilitate rotation against the spring reaction.

The signal contact equipment comprises a horizontal floor plate 49 secured to, and extending between, the upper extremities of the tilting arms 26 and 27 from which a press button switch of the type commonly known as "micro-switch" 50 is adjustably suspended upon a supporting bracket 51. The micro-switch is positioned with its actuating button 52 directed downwardly into resilient sliding contact with the cam block 36. Thus, each time one of the elements 17–21 is tilted in either direction, the actuating button 52 will travel from the flat top side 37 of the cam block to the cylindrical surface of the latter. Since the cylindrical surface of the cam block has a greater radius than the flat side thereof, the actuating button will actuate the micro-switch 50. The switch 50 is connected in a warning signal circuit, by means of a conductor cable 53, which includes any desired visual, audible, or record-recording signal equipment.

The mechanism as thus far described is independently duplicated in all of the elements 17, 18, 19, 20 and 21. In addition, the four elements 17, 18, 20 and 21 are provided with projecting, depressible wheel contact shoes 54. The shoes 54 on the elements 17 and 21 extend inwardly toward the rails 10 into the path of the wheel treads and the shoes on the elements 18 and 20 extend outwardly into the paths of the flanges of the wheels traveling along the rails. This spaces the elements from the rails sufficiently to avoid contact with the wheels yet provides means for detecting faulty equipment passing closely adjacent to the rails. The latter will contact one or more of the shoes 54 and tilt the elements to which the shoes are attached to actuate the micro-switch 50 of the tilted element or elements. The wheels, however, due to their rolling action, will simply depress the shoes 54 as they pass without tilting the elements. Should any wheel or wheels be locked and sliding, they will push the shoe in the direction of train travel to actuate the signal circuit 53 to give an indication of a sliding wheel.

Each of the shoes 54 projects outwardly through a vertically elongated opening 58 in the side frame member 23 of its element and each is mounted on and between the outer extremities of a pair of parallel supporting bars 55, the inner extremities of which are secured to the opposite sides of a pivot member 56 which is pivotally mounted upon a pivot pin 57 between the two flanges of the outer side frame member 24. Each shoe is resiliently supported on the extremity of a flexible set of leaf springs 59 which are bolted, as shown at 60, to a spring mounting member 61 pivotally mounted upon a hinge pin 62 between the flanges of the side frame member 24. The spring mounting member 61 can be inclined upwardly or downwardly, to increase or decrease the action of the set of leaf springs 59 by means of a spring tension screw 63 threaded through the spring mounting member 61 into contact with the side frame member 24. Cushion pads 77 are positioned at the top and bottom of the shoe opening 58 to cushion the terminal positions of the shoe.

A vertical switch-supporting plate 64 is secured between the top channel frame member 22 and the floor plate 49 at one side of the set of leaf springs 59. A second micro-switch, which will be herein designated as the wheel-counting switch 65, is adjustably secured, as indicated at 66, to the plate 64 with its actuating button, shown at 67, directed upwardly so as to be depressed by downward movement of the set of leaf springs 59. The wheel-counting switch 65 is connected, by means of a second conductor cable 68, into a second signal circuit which preferably includes a conventional travelling-chart-graphic-recorder (not shown) for indicating the passage of car wheels along the track. The first faulty-equipment-circuit can be also connected to the same graphic recorder to give graphic indications of faults alongside the wheel counting graph so that the location of damaged or dragging equipment can be quickly identified by comparison of the adjacent graphs on the travelling chart.

It has been found that, with rapidly moving trains, there was a tendency for an element, when returning from its tilted position, under the influence of one of the springs to rebound from the other spring, thus, creating a spring-actuated swing of the element for a few seconds which might interfere with the production of accurate records. This is avoided in the present invention by providing a brake shoe block 69, provided with suitable brake lining 70, which is constantly and resiliently forced upwardly against the circular portion of the cam block 36 by means of a spring leaf 71. The leaf 71 is mounted and secured at its one extremity to the bottom frame member 32 and extends beneath the brake shoe. The resilient pressure of the brake is adjustable through the medium of a set screw 72 threaded upwardly through the frame member 32 into contact with and below the other extremity of the spring leaf, as shown in FIGS. 6 and 9. The adjustment of the set screw 72 and the adjustment of the spring-locking bushings 39 is such as will bring the tilting elements to a stationary, vertical position immediately after an actuation. The brake shoe block 69 and the left spring 71 are maintained in proper position by a guide screw 79 threaded through the bottom frame member 32 and provided with a reduced upper extremity extending through the spring 71 and into the brake shoe block 69. It is preferred to position hardened wear plates 80 on the wheel contacting shoes to resist the wear from the passing wheels.

While a specific form of the improvement has been described and illustrated herein, it is to be understood that the same may be varied, within the scope of the appended claims, without departing from the spirit of the invention.

Having thus described the invention, what is claimed and desired secured by Letters Patent is:

1. A dragging equipment detector for use on a railroad track to actuate a signal circuit when contacted by equipment abnormally depending below a passing train comprising: an elongated base member extending transversally of said track below the rails of said track; a plurality of independent tilting elements tiltably mounted on and in alignment with said base member and projecting above the plane of said rails so that one or more of the tilting elements will be contacted and independently tilted by equipment depending from a passing train; means for resiliently maintaining said tilting elements in a substantially vertical position; a signal circuit switch carried by each of said tilting elements, said switches being incorporated in said signal circuit to actuate the latter; and means for independently actuating the signal circuit switch of each element in consequence of the tilting of that particular element, upon which it is mounted, in either direction.

2. A dragging equipment detector as described in claim 1 having a depressible shoe mounted in and projecting from a tilting element into the wheel path of a wheel; spring means supporting said shoe in its uppermost position so that the shoe may be resiliently depressed into said latter tilting element by a wheel rolling along said rail without imparting tilt to the latter tilting element and so that if said shoe is contacted by dragging equipment it will impart tilt the tilting element upon which it is mounted.

3. A dragging equipment detector as described in claim 2 having a second circuit switch in said signal circuit carried by said latter tilting element and means for actuating said second circuit switch solely in consequence of the depression of said shoe into said latter tilting element.

4. A dragging equipment detector as described in claim 1 in which the means for resiliently maintaining said tilting element in a substantially vertical position comprises: a horizontal, non-rotatable, pivot shaft in each element upon which said element is tiltably mounted; means for supporting said shaft in a fixed position from and above said base member; a substantially cylindrical, cam block fixedly mounted on said shaft intermediate the extremities of the latter; helical springs affixed to said block at their inner extremities and extending oppositely outward therefrom about said shaft; a spring-winding bushing fixedly mounted on the outer extremity of each spring, said springs being oppositely, torsionally tensed so that the spring-winding bushings will be urged to rotate in opposite directions; connecting means connecting said tilting member to said bushings so that the tilting element will be resiliently urged in opposite directions; and stop means on said shaft acting to stop rotation of said bushings when said tilting member has been urged to a substantially vertical position.

5. A dragging equipment detector as described in claim 4 in which the connecting means for connecting said tilting element to said spring-winding bushings comprises: radially projecting lobes on each of said bushings; lobe-engaging pins on said tilting element, certain of said pins engaging one side of the lobes of one bushing and other of the pins engaging the opposite side of the lobes of the other bushing so that tilting of said element in one direction will tighten one of said springs and tilting of said element in the other direction will tighten the other of said springs.

6. A dragging equipment detector as described in claim 5 in which the means for actuating said switch in consequence of the tilting of said tilting element comprises: an actuating button on said signal circuit switch; a flat side on the top of said cam block; means for supporting said switch in said element above said cam block with said button riding thereon so that when said element is tilted in either direction, said button will travel from said flat side to the cylindrical surface of said cam block to actuate said switch.

7. A dragging equipment detector as described in claim 1 having friction braking means mounted in said tilting elements arranged to resist the tilting of said elements to retard reciprocal reactive tilting of the latter.

8. A dragging equipment detector as described in claim 7 in which the friction braking means comprises a spring-loaded brake shoe mounted in each of said tilting elements and frictionally and resiliently engaging the stationary cam block therein to resist and dampen tilting movement of the tilting element about said cam block.

References Cited
UNITED STATES PATENTS

| | | | |
|---|---|---|---|
| 2,581,084 | 1/1952 | Dryden | 246—169 X |
| 2,662,973 | 12/1953 | McGowan et al. | 246—169 X |
| 2,691,722 | 10/1954 | Lewis | 246—169 X |
| 2,848,602 | 8/1958 | Post | 246—246 |
| 2,993,988 | 7/1961 | Post et al. | 246—169 |

ARTHUR L. LA POINT, *Primary Examiner.*

STANLEY T. KRAWCZEWICZ, *Examiner.*